W. W. SCOTT AND A. J. WOHLPART.
MACHINE FOR STITCHING COLLARETS TO GARMENTS.
APPLICATION FILED SEPT. 16, 1918.

1,361,411.

Patented Dec. 7, 1920.

W. W. SCOTT AND A. J. WOHLPART.
MACHINE FOR STITCHING COLLARETS TO GARMENTS.
APPLICATION FILED SEPT. 16, 1918.

1,361,411.

Patented Dec. 7, 1920.
7 SHEETS—SHEET 7.

UNITED STATES PATENT OFFICE.

WALTER W. SCOTT, OF AMSTERDAM, AND AUGUST J. WOHLPART, OF NEW YORK, N. Y., ASSIGNORS TO UNION SPECIAL MACHINE COMPANY, OF CHICAGO, ILLINOIS, A CORPORATION OF ILLINOIS.

MACHINE FOR STITCHING COLLARETS TO GARMENTS.

1,361,411.  Specification of Letters Patent.  Patented Dec. 7, 1920.

Application filed September 16, 1918. Serial No. 254,273.

*To all whom it may concern:*

Be it known that we, WALTER W. SCOTT and AUGUST J. WOHLPART, citizens of the United States, residing at, respectively, Amsterdam, county of Montgomery, and State of New York, and New York city, county of New York, and State of New York, have invented certain new and useful Improvements in Machines for Stitching Collarets to Garments, of which the following is a description, reference being had to the accompanying drawings and to the figures of reference marked thereon.

The invention relates to new and useful improvements in sewing machines and more particularly to a sewing machine for stitching collarets to garments, wherein means is provided for guiding and shaping the collaret at the same time it is stitched to the garment.

In the application of Walter W. Scott, Serial Number 244,368, filed July 11, 1918, there is shown, described and claimed devices associated with a sewing machine for guiding, shaping and stitching a collaret to a garment, which devices are so constructed and positioned relative to the stitching mechanism that they may be shifted by the operator at will and when so shifted the feed of the machine drawing the collaret strip through said guiding devices will cause a gradual shifting of the collaret strip at the trimming point, so as to shape the collaret strip. The present invention is directed to an improvement in the devices shown and described in the said Scott application.

An object of the present invention is to provide means for swinging the guide which directs the collaret strip, so that it may be moved in one direction by hand and set and locked in said set position and automatic means for moving the guide in the other direction when released from the locking means.

A further object of the invention is to provide means whereby the guide may be swung to a greater extent when tapering the finishing off end of the collaret, so as to insure a similar shaping of both ends of the collaret strip.

A still further object of the invention is to provide means for insuring that the collaret strip is not moved out of range of the trimming mechanism when the guide is shifted to extreme position.

These and other objects will in part be obvious and will in part be hereinafter more fully described.

In the drawings which show by way of illustration one embodiment of the invention.

Figure 15:
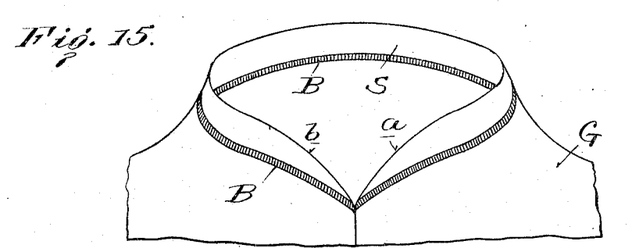
Fig. 15 is a view showing more or less diagrammatically and in perspective a garment having a tapered collaret strip stitched thereto.
Figure 17:
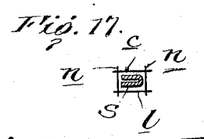
Fig. 17 is a sectional view on the line $x$—$x$ of Fig. 16.
Figure 18:
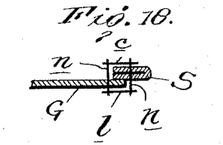
Fig. 18 is a sectional view on the line $y$—$y$ of Fig. 16.
Figure 19:
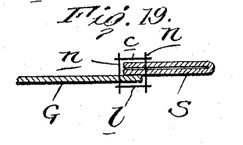
Fig. 19 is a sectional view on the line $z$—$z$ of Fig. 16.

The invention as noted above, is particularly adapted for the shaping of the collaret strip at the ends thereof and the stitching of the same to the body of a garment. In Fig. 15 is shown a garment at G, to which a strip indicated at S has been stitched. It will be noted that this collaret strip is tapered from about the points $a$ and $b$ to the respective ends of the strip. The collaret strip is secured to the garment by stitches indicated at B. These stitches as herein shown, are covering stitches and are preferably formed by two spaced needles with a coöperating thread laying member above the material, and a looper coöperating with both needles below the material. In Figs. 17 to 19 inclusive, the needle threads are indicated at $n$—$n$, the upper covering thread at $c$ and the looper thread at $l$.

The machine to which the invention has been applied, includes a supporting bed 1, on which is mounted a work support 2 and an overhanging arm 3. Mounted in the overhanging arm 3 is a reciprocating needle bar 4, carrying a pair of needles 5—5. These needles 5—5 are provided with needle threads $n$—$n$. The needle bar is reciprocated by a needle lever 6, which is operated by an eccentric strap 7 from the main shaft 8. Coöperating with the needles beneath the work support, is a looper which is moved into and out of both the needle loops by a link 9 connected to a needle lever extension 10. The material is held on the work support by a presser foot 11, carried by a presser bar 12. This presser foot has a guide slot 13, into which the upturned edges of fabric sections may be directed. These upturned edges of the fabric sections may be trimmed by horizontally disposed trimming members. In the drawings, the stationary trimming member is indicated at 14 and this member is carried by a presser foot. The movable trimming member is indicated at 15 and this member is reciprocated back and forth across the guiding slot 13 by suitable devices. The cross thread $c$ is led through a guide 16 and a hook 17 coöperating therewith, forms the same in loops, which join the needle threads on the upper surface of the fabric. The material is fed across the work support by feed dogs indicated at 18, in the drawings. The above parts are of the usual construction and form no part of the present invention *per se* and therefore, further detail description of these parts is not thought necessary.

The collaret strip is led from a suitable supply spool, through a guide 19, which is secured to a bracket plate 20 attached to the bed plate by suitable screws 21. This guide 19 is of the English binder type; that is, it folds the collaret strip between its edges and inverts the strip as it passes from the guide. The collaret strip indicated at S in the drawing after it leaves the guide 19, passes through a shiftable guide 22. This guide 22 is rectangular in cross section and is provided with a center plate 23 to assist in guiding the strip with the edges of the strip substantially in line. This guide 22 is pivoted at 24 to an arm 25 projecting from the bracket plate 20. The guide 22 is free to swing on the pivot 24. An adjustable screw 26, carried by the guide 22, is adapted to engage an arm 27 carried by the bracket plate 25 and limit the movement of the guide 22 in a counter-clockwise direction about its pivotal support. An adjustable screw 28 carried by this guide, engages a stop shoulder 29 also formed on this bracket plate 25 and limits the movement of the guide in a clockwise direction.

Figure 1:
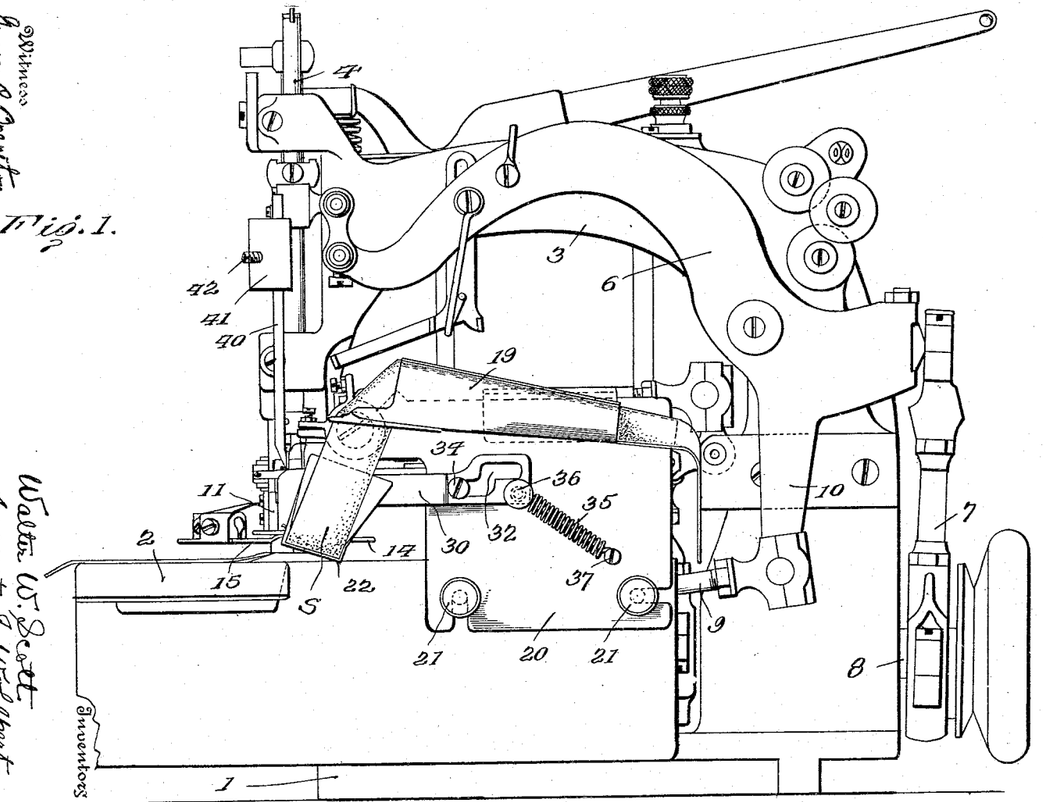
Figure 1 is a front view of a machine having the improvements applied thereto.
Figure 2:
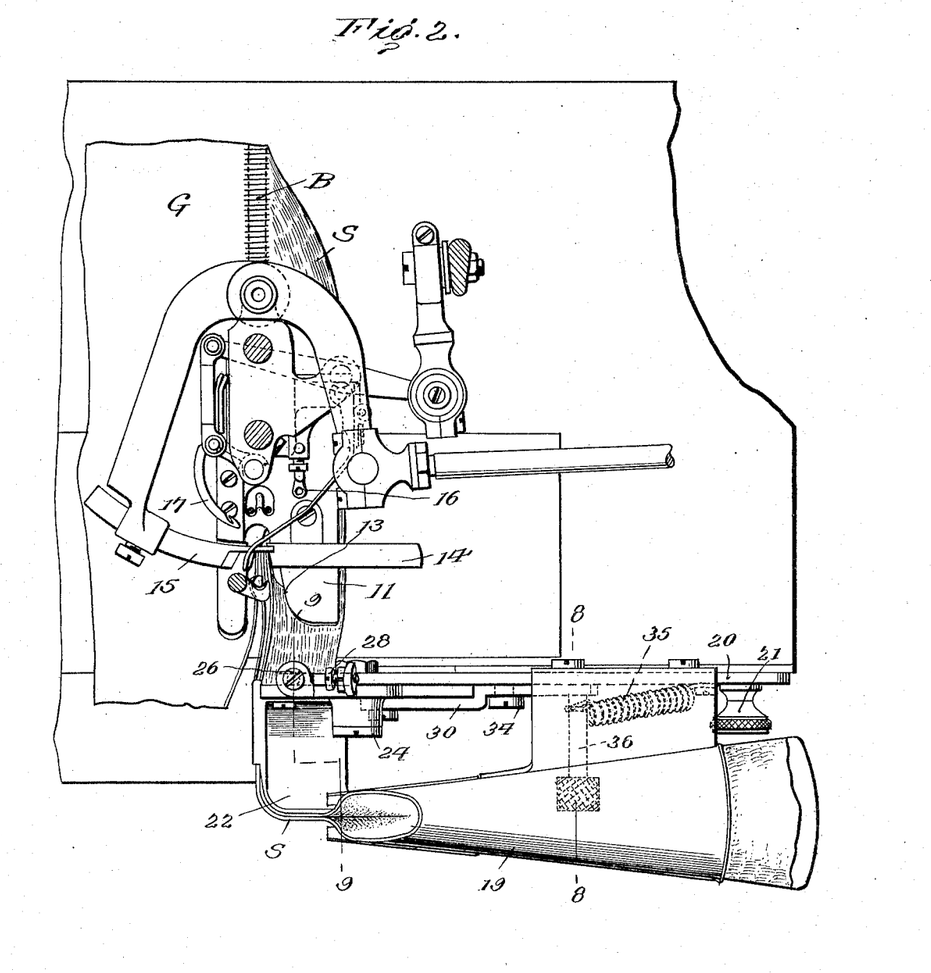
Fig. 2 is a view partly in section and partly in plan of the parts immediately above the work support of the machine.
Figure 3:
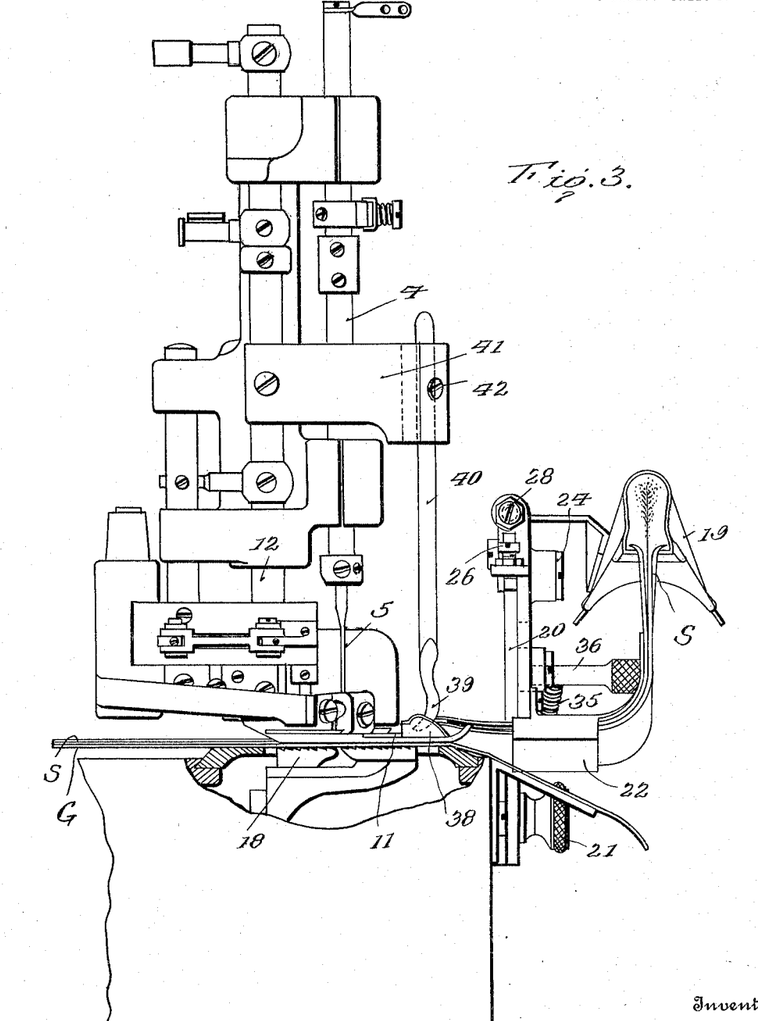
Fig. 3 is an end view of the machine with parts broken away to show the feed dogs.
Figure 4:
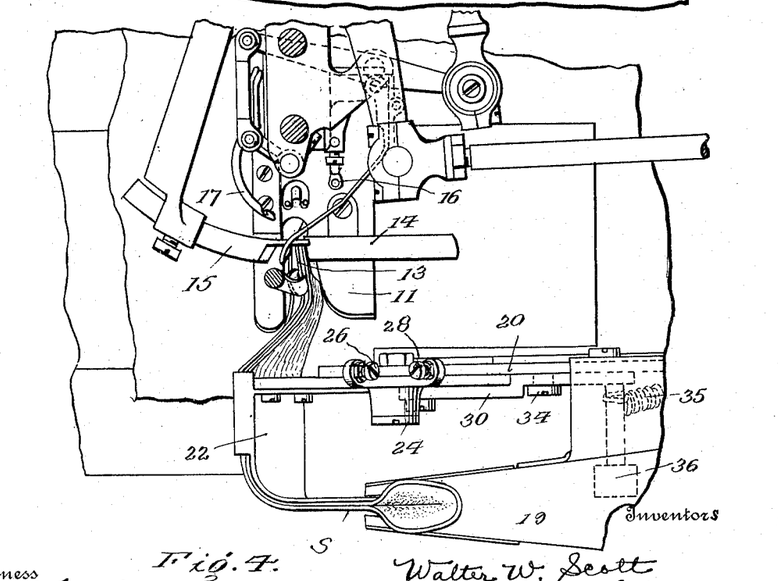
Fig. 4 is a view in part similar to Fig. 2, but showing the guide swung to its extreme left hand position for tapering off the finishing end of the collaret.
Figure 5:
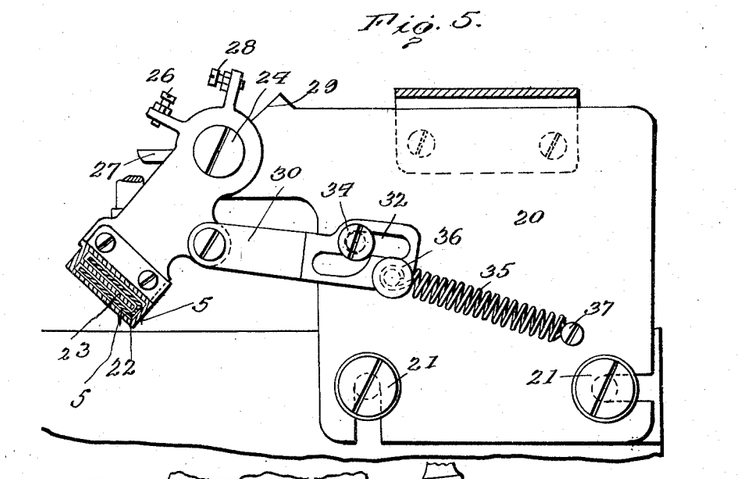
Fig. 5 is a view showing more or less diagrammatically the position of the guide at the beginning of the operation of the stitching of the collaret to the garment.
Figure 6:
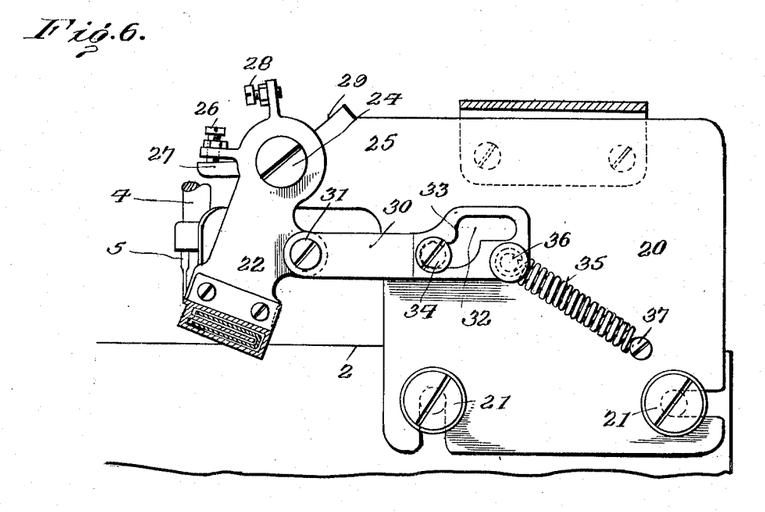
Fig. 6 is a similar view, but showing the guide as tripped and thrown by the spring to position for the tapering of the end of the garment adjacent the starting point.
Figure 7:
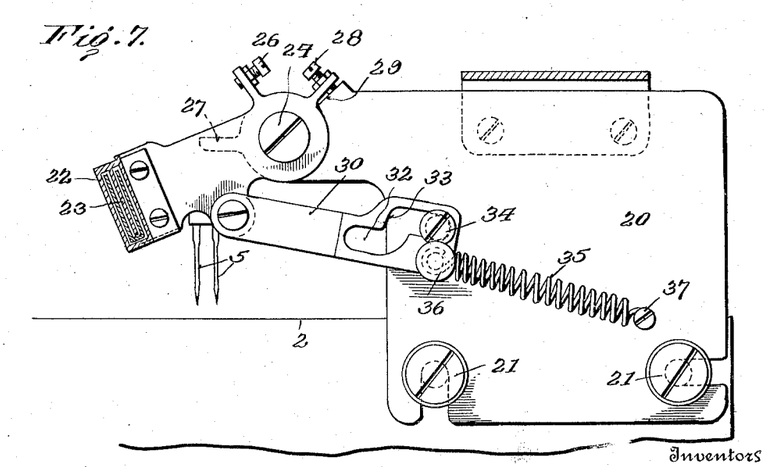
Fig. 7 is a similar view, but showing the position of the guide for the tapering of the finishing end of the collaret.
Figure 8:
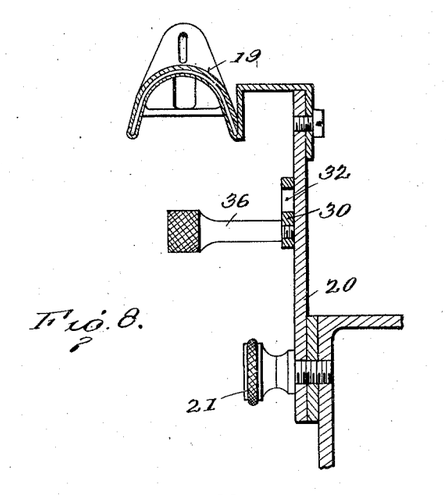
Fig. 8 is a sectional view on the line 8—8 of Fig. 2.
Figure 9:
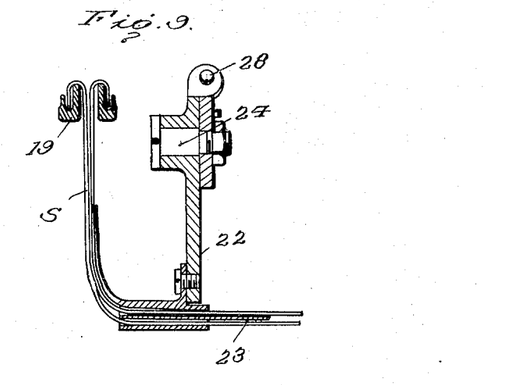
Fig. 9 is a sectional view on the line 9—9 of Fig. 2.
Figure 10:
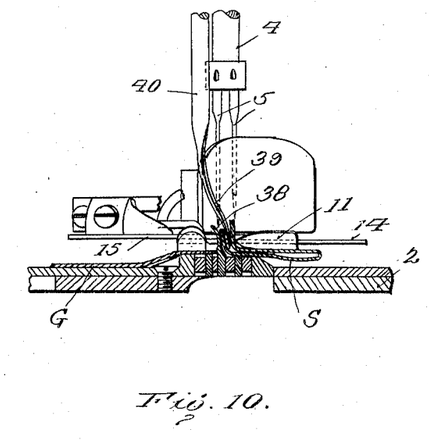
Fig. 10 is a transverse sectional view in front of the presser foot.
Figure 11:
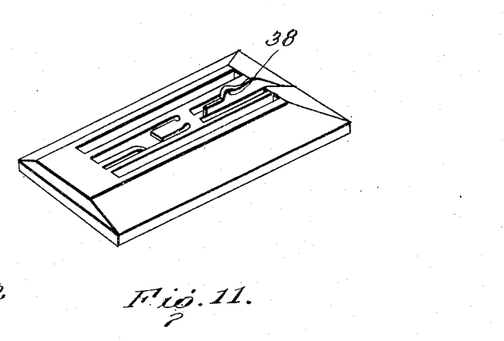
Fig. 11 is a perspective view of the throat plate.
Figure 12:
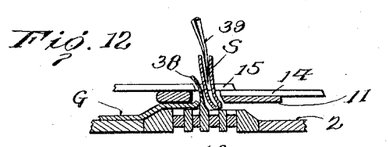
Fig. 12 is a sectional view through the presser foot and throat plate in front of the trimming members, with the collaret strip positioned for stitching between garments or chaining off.
Figure 13:
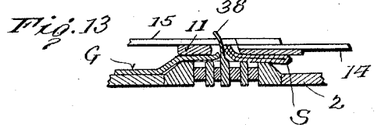
Fig. 13 is a similar view, but showing the collaret strip positioned when the full width of the collaret strip is at the back of the garment.
Figure 14:
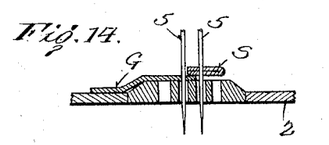
Fig. 14 is a view showing the needles, throat plate, the collaret strip and the body garment when the strip is being stitched to the garment.

A bar 30 is pivoted at 31 to this guide 22. This bar 30 has a cam slot 32 formed therein. The slot has two horizontal sections, one above the other and a connecting section which forms a shoulder 33. A screw 34 extends through this slot and is threaded into the plate 25. The shank of the screw fits loosely in the slot. A spring 35 is attached at one end to a pin 36 connected to the bar 30 and at its other end to a pin or screw 37 attached to the bracket plate 25. This spring normally tends to force the guide to the right as viewed in Fig. 6, holding the screw 26 against the stop arm 27 or holding the shoulder 33 against the screw 34 as shown in Fig. 5 of the drawings. From the above it will be apparent that the guide may be set in the position shown in Fig. 5 of the drawings with the screw against the shoulder 33. The pin 36 is extended so that it may be readily accessible to the operator for shifting the bar 30. The operator striking the pin an upward blow, will trip the bar from the screw 34 and the spring will move the guide to the right to the position shown in Fig. 6. The operator may also by grasping the pin 36, move the guide to the position shown in Fig. 7, where the stop screw 28 makes engagement with the stop shoulder 29.

The collaret strip after leaving the guide 22 passes along a guide lip 38, which assists in turning up the edges of the collaret strip and directing the same into the guide 13 in the presser foot and also assists in presenting these upturned edges to the trimming members indicated at 14 and 15 in the drawings. The guide finger 39 extends between the upper and lower side faces of the collaret strip. This guide finger is formed as a part of a rod 40 adjustably secured to the bracket 31 by means of a set screw 42.

Figure 16:
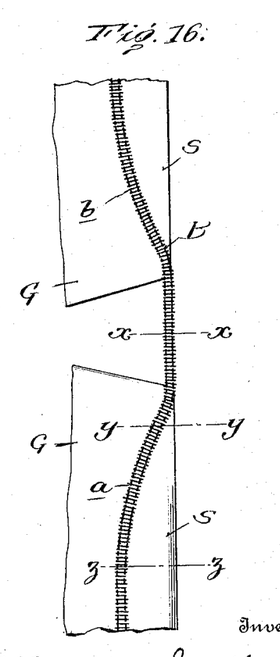
Fig. 16 is a view showing the finishing of one collaret, the chaining off and the beginning of another collaret.

For the beginning of the stitching of the collaret, the guide 22 is set in the position indicated in Fig. 5. When the guide is in this position and the machine has been running for a time, the collaret strip is directed to the trimming members so that the line of cutting of the collaret strip is close to the fold in the collaret strip and only a sufficient portion of the collaret strip remains to feed the strip to the machine. With the parts as adjusted in the drawings, this section remaining of the collaret strip is completely covered by the stitching threads as shown in Fig. 17 of the drawings. The operator places the body garment and as the edge of the garment approaches the stitching mechanism, the guide is tripped by raising the pin 36 so that the spring 35 throws the guide to the position shown in Fig. 6 of the drawings. This shifting of the guide occurs instantly and possibly during the formation of a single stitch. The guide is at some distance in front of the presser foot, so that the shifting of the strip bodily may occur, although the strip is clamped by the presser foot. The feed draws the strip underneath the presser foot and the strip at once begins to shift gradually at the trimming point to take up its new position of lead in under the foot. As a result, the line of trimming gradually shifts away from the folded edge of the collaret strip and in the curved line from the edge of the garment to the letter $a$ see Fig. 16. This produces a gradual tapering of the collaret strip. The stitching proceeds after the point $a$ is reached and the strip is then of its normal width until the point is reached where it is desired to taper and finish the end of the collaret strip to correspond to the beginning end thereof. Let us assume, that this position is at the point $b$ at the upper part of Fig. 16. When this point is reached, the operator manually shifts the guide 19 to the position shown in Fig. 7. The feed continues to draw the strip underneath the foot and the strip gradually assumes its new position of lead in underneath the foot and as a result, the line of trimming is curved from the point indicated at $b$ to the edge of the garment. In order to make the taper at the finishing end of the collaret the same as at the beginning end of the collaret, it is found necessary to shift the guide to a position slightly beyond that shown in Fig. 5. In this extreme position of the guide, the collaret strip is liable to be thrown out of range of the trimming members and so we have provided the guide finger 39, which insures that the strip will be led to the trimming members so that a portion of the strip will always remain after the trimming operation. If the strip should be cut clear off, there would be nothing to cause the feeding in of the strip, so that the strip could be fed as the machine chains off. It will be noted that the guide is shifted at will by the operator and the time at which the tapering begins is therefore controlled by the operator. No matter what the size of the neck of the garment may be, the operator when the desired point is reached, shifts the guide and the tapering of the collaret begins. On the other hand, when passing between garments, no matter how long a time occurs, the operator can always begin the tapering of the strip at the right point for the attachment of the strip to the garment. It will also be noted that while the operator shifts the guide to bring about the tapering of the collaret, that the tapering of the strip is accomplished by the feed of the machine and the extent to which the guide is shifted determines the character of the tapering at the ends of the collaret.

It will be noted that the guide is pivoted at a point well above the work support and at one side of a vertical plane containing the line of feed and as a result, the guide will swing in a curved path, which tends to carry the strip up through the guiding slot. This assists greatly in the directing of the strip to the trimming mechanism and the stitching mechanism.

It will be obvious that minor changes in the details of construction and arrangement of parts may be made without departing from the spirit of the invention as set forth in the appended claims.

Having thus fully described the invention, what we claim as new and desire to secure by Letters Patent, is:—

1. The combination with a sewing machine having stitching mechanism, feeding mechanism and trimming mechanism operating in advance of the stitching mechanism, of a strip guide for directing a strip to the trimming mechanism and stitching mechanism, means for supporting said guide, whereby it may be shifted transversely of the line of feed from one extreme guiding position to another for tapering the strip being stitched and means disposed between the guide and the trimming mechanism for preventing the guide when shifted, from withdrawing the strip from range of the trimming mechanism.

2. The combination with a sewing machine having stitching mechanism, feeding mechanism and trimming mechanism operating in advance of the stitching mechanism, of a strip guide for directing a strip to the trimming mechanism and stitching mechanism, means for supporting said guide, whereby it may be shifted from one extreme guiding position to another for tapering the strip and a guide finger extending between the side faces of the strip and located between the guide and the trimming mechanism, for preventing the guide when shifted, from withdrawing the strip from range of the trimming mechanism.

3. The combination with a sewing machine having stitching mechanism, feeding mechanism and trimming mechanism operating in advance of the stitching mechanism, of a strip guide for directing a strip to the trimming mechanism and stitching mechanism, means for supporting said guide, whereby it may be shifted at will by the operator transversely of the line of feed from one extreme guiding position to another, said guide being disposed a sufficient distance in advance of the trimming mechanism, so that the strip will swing to permit the shifting of the guide, manual means for shifting the guide in one direction and a spring for automatically shifting the guide in the other direction.

4. The combination with a sewing machine having stitching mechanism, feeding mechanism and trimming mechanism operating in advance of the stitching mechanism, of a strip guide for directing a strip to the trimming mechanism and stitching mechanism, means for supporting said guide, whereby it may be shifted at will by the operator transversely of the line of feed from one extreme guiding position to another, said guide being disposed a sufficient distance in advance of the trimming mechanism, so that the strip will swing to permit the shifting of the guide, manual means for shifting the guide in one direction and a spring for automatically shifting the guide in the other direction, and devices for holding the guide from movement by the spring while stitching from one garment to another.

5. The combination with a sewing machine having stitching mechanism, feeding mechanism and a trimming mechanism including horizontally disposed trimming blades in advance of the stitching mechanism, of a strip guide for directing a collaret strip to the trimming mechanism and stitching mechanism, means for pivotally supporting said guide, whereby it may be shifted at the will of the operator in a plane at right angles to the line of feed and from one extreme guiding position to another for tapering the collaret strip, stops for limiting the movement of the guide in each direction, a bar connected to the guide means for swinging the guide, means for manually shifting the bar in one direction and a spring for shifting the bar in the opposite direction.

6. The combination with a sewing machine having stitching mechanism, feeding mechanism and a trimming mechanism including horizontally disposed trimming blades in advance of the stitching mechanism, of a strip guide for directing a collaret strip to the trimming mechanism and stitching mechanism, means for pivotally supporting said guide, whereby it may be shifted at the will of the operator in a plane at right angles to the line of feed and from one extreme guiding position to another for tapering the collaret strip, stops for limiting the movement of the guide in each direction, a bar connected to the guide, means for guiding the bar, means for manually shifting the bar in one direction and a spring for shifting the bar in the opposite direction, said bar having a cam slot formed therein, a screw freely engaging the cam slot, said slot being shaped so as to provide a shoulder adapted to engage the screw and hold the bar from movement under the action of the spring.

7. The combination with a sewing machine having stitching mechanism, feeding mechanism and a trimming mechanism including horizontally disposed trimming blades in advance of the stitching mechanism, of a strip guide for directing a collaret strip to the trimming mechanism and stitching mechanism, means for pivotally supporting said guide, whereby it may be shifted at the will of the operator in a plane at right angles to the line of feed and from one extreme guiding position to another for tapering the collaret strip, stops for limiting the movement of the guide in each direction, a bar connected to the guide means for guiding the bar, means for manually shifting the bar in one direction and a spring for shifting the bar in the opposite direction, and a guide finger disposed between the guide and the trimming mechanism and located between the side faces of the strip for preventing the guide when shifted, from withdrawing the strip from range of the trimming mechanism.

8. The combination with a sewing machine having stitching mechanism, a presser foot having a guiding slot for the upturned edges of a fabric strip, feeding mechanism, horizontally disposed trimming members located in advance of the stitching mechanism and operating to trim the upturned edges of the strip, of a strip guide for directing a strip to the trimming members, means for pivotally supporting said strip guide at a point above the presser foot and at one side of a vertical plane passing through the guiding slot, said guide being disposed a sufficient distance in advance of the trimming mechanism, so that the strip may swing to permit a shifting of the guide.

9. The combination with a sewing machine having stitching mechanism, a presser foot having a guiding slot for the upturned edges of a fabric strip, feeding mechanism, horizontally disposed trimming members located in advance of the stitching mechanism and operating to trim the upturned edges of the strip, of a strip guide for directing a strip to the trimming members, means for pivotally supporting said strip guide at a point above the presser foot and at one side of a vertical plane passing through the guiding slot, said guide being disposed a sufficient distance in advance of the trimming mechanism, so that the strip may swing to permit a shifting of the guide, and a guide finger between the guide and the trimming members for preventing the guide when shifted, from withdrawing the strip from the range of the trimming members.

10. The combination with a sewing machine having stitching mechanism, a presser foot having a guiding slot for the upturned edges of a fabric strip, feeding mechanism, horizontally disposed trimming members located in advance of the stitching mechanism and operating to trim the upturned edges of the strip, of a strip guide for directing a strip to the trimming members, means for pivotally supporting said strip guide at a point above the presser foot and at one side of a vertical plane passing through the guiding slot, said guide being disposed a sufficient distance in advance of the trimming mechanism, so that the strip may swing to permit a shifting of the guide, manual means for shifting the guide in one direction and a spring for shifting the guide in the opposite direction, a latch for holding the guide in said position against the action of the spring for stitching from one garment to another.

In testimony whereof we affix our signatures in the presence of two witnesses.

WALTER W. SCOTT.
AUGUST J. WOHLPART.

Witnesses for Walter W. Scott:
  C. McNEIL,
  J. F. KELLY.
Witnesses for A. J. Wohlpart:
  L. ONDERDONK,
  MATTHEW P. RYAN.